3,101,275
PROCESS OF COATING A SHAPED SWOLLEN POLYMER SUBSTRATE AND TREATING WITH IONIZING RADIATION
Theodore Cairns, Greenville, and Boynton Graham and David Tanner, Wilmington, Del., assignors to E. I. du Pont de Nemours and Company, Wilmington, Del., a corporation of Delaware
Filed May 15, 1957, Ser. No. 659,227
23 Claims. (Cl. 117—47)

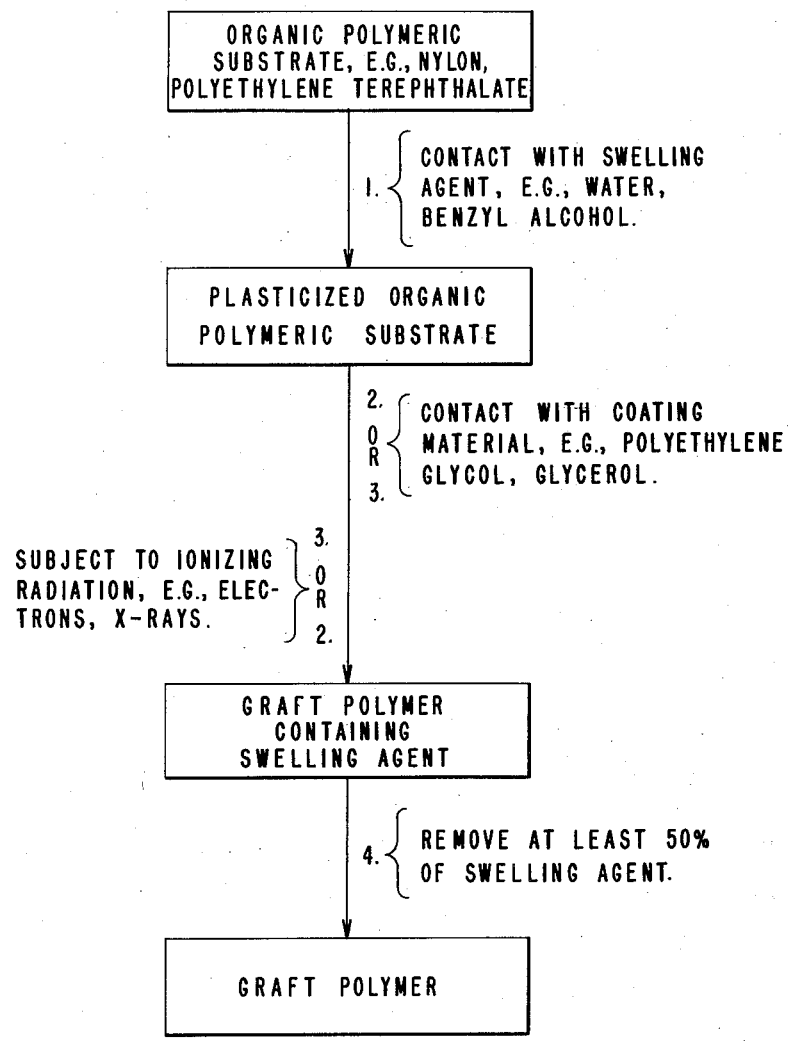

This invention is concerned with an improved method for affixing coatings to organic polymers.

The utility of a fabric or a film of an organic polymeric material is often dependent on its surface characteristics. Thus, polymeric films which have excellent physical properties for use as packaging materials may be useless for application by modern packaging machinery until the surface slip is improved by a coating which prevents blocking in the machine. Similarly, fabrics made of organic polymeric fibers with high strength and durability may have little utility in garments until the electrical attraction of the fabric for itself or for dust is reduced by applying an anti-static coating.

It has recently been shown that, when surface coatings are affixed to organic polymers by the action of ionizing radiation, applied either after or, in some instances, before the coating is put in place, the coating becomes chemically bonded to the substrate. Such coatings are virtually impossible to remove without destroying the substrate. There are obvious advantages to such a firm attachment of a desired coating, for example, an anti-static coating on a fabric which is subject to both wear and laundering or dry cleaning.

An object of the present invention is to provide improvements in the affixing of coatings to organic polymers by means of ionizing radiation.

A more specific object is to provide a process of affixing coatings to organic polymers by means of ionizing radiation in which the efficiency of utilization of the ionizing radiation is increased.

In the furtherance of the above-mentioned and yet other objectives, it has now been discovered that when a polymer is swollen by the presence of a compatible swelling agent, the efficiency of radiation-grafting of surface coatings on the polymer is surprisingly increased, so that for a given radiation dosage a greater amount of coating material is attached. It has also been unexpectedly found that the coating is primarily attached to the polymer substrate and that the swelling agent may be subsequently extracted through the coating with substantially no loss of the attached coating. This fact makes it possible to increase greatly the efficiency of radiation by employing large amounts of swelling agents (which might undesirably lower the softening temperature of the finished article if left in place) and, after affixing the coating, removing part or all of the swelling agent. Both the swelling agent and any solvent used to extract it may be recovered for reuse.

More specifically, the process of this invention comprises (1) swelling an organic polymer by incorporating at least about 3–50% by weight thereof of a compatible, non-polymerizable swelling agent, (2) subjecting the swollen polymer to ionizing radiation either before or after, (3) contacting the polymer with a coating material which is chemically distinguishable from both the polymer substrate and the swelling agent and (4) removing at least 50% of the incorporated swelling agent.

The appended drawing, a self-evident flowsheet, illustrates the instant process. The numerals represent the order of the steps, the optional sequence of the intermediate steps being shown by the alternativeness of the numerals.

The organic polymers suitable as substrates include any of the normally solid synthetic condensation or addition polymers, particularly those with molecular weights in excess of 1000. The polymers may be oriented or unoriented and are shaped prior to the irradiation step. Thus, there may be employed hydrocarbon polymers, such as polyethylene, polypropylene, polystyrene, polybutadiene, rubber, polyisobutylene, butadiene/styrene copolymers and the like; halogenated hydrocarbon polymers, such as polyvinyl chloride, polyvinylidene chloride, polychloroprene, polytetrafluoroethylene, polyvinyl fluoride and the like; ester-containing polymers, such as polyvinyl acetate, polymethyl methacrylate, polyethylene terephthalate and the like; hydroxyl-containing polymers, such as polyvinyl alcohol and the like; ether-containing polymers, such as solid polytetrahydrofuran, polyformaldehyde dioxolane polymers and the like; condensation polymers, such as phenol-formaldehyde polymers, urea-formaldehyde polymers, triazine-formaldehyde polymers, polyamides, polyimides and the like; polyacrylonitrile, polyvinyl acetals and mixtures or copolymers based on two or more of the above compounds, as well as natural polymers such as wool, silk and the like.

In this invention a preferred group of substrate materials are the polymers with crystalline melting temperatures of 200° C. and above, since such polymers are otherwise relatively resistance to radiation-induced bonding reactions. This group includes polyacrylonitrile, polyvinyl carbazole, polyvinyl alcohol, polyacrylic acid, polymethacrylic acid, polytetrafluoroethylene, polychlorotrifluoroethylene, polyethylene terephthalate, polyamide 6-6, polyamide 6-10, polyamide 10-6, polyamide 4-6, polyvinyl fluoride, meta - phenylenediamine/isophthalic acid condensation polymer and the like.

Also included in the group of preferred substrates are those polymers which, although normally essentially amorphous, have second-order transition temperatures of at least 42° C. As was shown by Beaman, J. Polymer Sci. 9, 470 (1952), such temperatures are equivalent to crystalline melting temperatures of at least 200° C. Examples of these polymers are polymethyl methacrylate, polyethyl methacrylate, polyvinyl chloride, polystyrene and polyvinyl butyral.

In the process of the invention the non-polymerizable swelling agent is preferably a liquid and is incorporated into the polymeric substrate prior to irradiation. The means used to accomplish this incorporation are not critical as long as the swelling agent is uniformly incorporated into the polymer. For example, the swelling agent may be incorporated into a monomer prior to preparation of the polymer. The resulting plasticized polymer is then shaped ready for use in the present invention. Alternatively, the polymer may be dissolved in a solvent, the swelling agent added to the solution, and a shaped polymer formed by removal of the solvent from the resulting solution. With thermoplastic polymers, the polymer may be heated and worked as on mixing rolls, a screw-stuffer, or a Banbury mixer and the swelling agent added directly to the hot polymer which is then shaped ready for use in this invention. With many polymers it is simplest to soak the shaped polymer in the swelling agent until the desired amount of the agent has been imbibed into the polymer. This method is particularly useful with polymeric shapes, such as films and filaments, in which the minimum dimension is 0.1 inch or less. It is not essential for the swelling agent to be present throughout the entire mass of the shaped polymer. The improved radiation efficiency of this invention is obtained when the swelling agent is incorporated into the polymer surface to a depth of at least 1 micron and preferably at least 10 microns.

The swelling agents which are useful in this invention are limited only by the requirements that they be (1) swelling agents for the given substrate as described below, (2) chemically distinguishable from the substrate polymer, the monomeric species of the polymer and the coating material, (3) compatible to the extent of at least 3% by weight with the substrate polymer, and (4) substantially removable by evaporation or extraction with a selective solvent after the irradiation and coating steps.

Plasticizers and solvents which are among those suitable for use as swelling agents in this invention are shown by Schmidt and Marlies, "Principles of High Polymer Theory and Practice," McGraw-Hill, 1948, Tables E-2 and E-3, pages 700-706. In general it may be said that the operable swelling agents are materials, preferably liquid, which, when the substrate polymer is immersed therein, cause the substrate polymer to (a) swell at least 10% by volume, (b) soften to the extent of a decrease in stiffness modulus of at least 10% or (c) dissolve.

The preferred swelling agents in this invention are those materials which are liquid at temperatures in the range of 15-30° C. and boil above 75° C. There may be employed esters such as methyl adipate, di(2-ethylhexyl)adipate, tributyl phosphate, tricresyl phosphate, dimethyl phthalate, diisooctyl phthalate, dioctyl sebacate and butyrolactone as well as liquid polyethylene glycols, chlorinated biphenyls, glycerol, benzyl alcohol, dinonylnaphthalene, n-ethyl-p-toluenesulfonamide, dimethylformamide, and inorganic liquids such as water, aqueous acids and bases, and hydrotropic salt solutions, e.g., saturated aqueous lithium bromide, saturated aqueous calcium thiocyanate and the like.

The term "compatible" is used here in its recognized meaning in the art of synthetic resins and polymers to describe the relationship of a polymer and a plasticizer which, when thoroughly blended, yield a stable, single-phase composition. Other phases are represented by pigments and fillers may also be present, but this does not affect the requirement for compatibility of the swelling agent with the polymer.

The stability required of the single phase of the polymer and the swelilng agent in this invention concerns only the time prior to the extraction step. It will be obvious that some swelling agents which might be unacceptable as commercial plasticizers because of a slight tendency toward phase separation on long storage may be fully acceptable in the present invention. In fact, such materials are preferred since they are usually easier to extract.

Suitable ionizing radiations for use in this invention include both radiation in the form sometimes regarded as particle radiation and radiation in the form sometimes regarded as ionizing electromagnetic radiation.

By particle radiation is meant a stream of particles such as electrons, protons, neutrons, alpha-particles, deuterons, beta-particles, or the like, so directed that the said particles impinge upon the swollen organic polymer. The charged particles may be accelerated by means of a suitable voltage gradient, using such devices as a cathode ray tube, resonant cavity accelerator, a Van de Graaff accelerator, a Cockcroft-Walton accelerator, or the like, as is well known to those skilled in the art. Neutron radiation may be produced by suitable nuclear reactions, e.g., bombardment of a beryllium target with deuterons or alpha-particles. In addition, particle radiation suitable for carrying out the process of the invention may be obtained from an atomic pile, or from radioactive isotopes or from other natural or artificial radioactive materials.

By ionizing electromagnetic radiation is meant radiation of the type produced when a metal target (e.g., tungsten) is bombarded by electrons possessing appropriate energy. Such radiation is conventionally termed X-ray. In addition to X-rays produced as indicated above, ionizing electromagnetic radiation suitable for carrying out the process of the invention may be obtained from a nuclear reaction ("pile") or from natural or artificial radioactive material. In all of these latter cases the radiation is conventionally termed gamma rays.

It is recognized that the energy characteristics of one form of ionizing radiation can be expressed in terms which are appropriate for another form. Thus, one may express the energy of either the particles of radiation commonly considered as particle radiation or of the photons of radiation commonly considered as wave or electromagnetic radiation in electron volts (e.v.) or million electron volts (m.e.v.). In the irradiation process of this invention, radiation consisting of particles or photons having an energy of 50 e.v. and over may be employed and particles or photons having an energy of 0.1 m.e.v. and over are preferred. With radiation of this type, attachment of the coating to the swollen substrate can be obtained with a minimum length of exposure to the radiation, permitting maximum efficiency in utilization of the radiation. Particles or photons with an energy equivalent of 0.5-4 m.e.v. are the most useful from a practical standpoint, although radiation with energies of 10 m.e.v. and higher may be employed.

A minimum exposure of at least 0.001 watt-sec./cm.$^2$ at the surface of the swollen polymer is necessary since lower degrees of exposure do not give adequate activation of the surface toward the bonding of the coating material. The weight of the coating affixed in the contacting step usually increases with increasing degrees of exposure. Upper exposure limits depend on the degree of bonding desired and on the radiation resistance of the polymeric substrate. Exposures as high as 1000 to 10,000 watt-sec./cm.$^2$ may be utilized in coating radiation-resistant polymers such as polystyrene and polyethylene terephthalate, whereas exposures of 100 to 1000 watt-sec./cm.$^2$ may suffice for more sensitive polymers such as polyvinyl chloride and the polyamides. The exposure may be carried out in one slow pass, or in several faster ones and may be conducted at any convenient amperage.

Coating materials for use in this invention must be chemically distinguishable from the swelling agent, the substrate polymer and the monomeric species from which the substrate polymer is derived. The coating material may be (1) an organic compound, i.e., a compound having at least one C—X bond, where X is hydrogen, halogen or carbon, (2) an organo-inorganic compound, (3) an inorganic oxide, or (4) an inorganic salt.

Suitable organic compounds include aliphatic and aromatic hydrocarbons, halogenated hydrocarbons, alcohols, amines, aldehydes, ketones, ethers, acids, esters, amides, vinyl monomers, phenols, fats, synthetic organic polymers and the like. Organic coating materials are preferred for ease of grafting and versatility of effects, and non-polymerizable ones are especially preferred, since they are otherwise frequently hard to graft.

Suitable organo-inorganic compounds include the metal alkyls, Grignard reagents, and salts of organic acids with inorganic bases such as calcium acetate, lead tetraacetate, sodium polymethacrylate and the like. Suitable inorganic salts and oxides include the fluorides, chlorides, bromides, iodides, nitrates, sulfates, silicates, borates, chlorates, chromates, and oxides of sodium, potassium, magnesium, calcium, titanium, vanadium, chromium, molybdenum, manganese, iron, cobalt, nickel, copper, silver, gold, zinc, cadmium, mercury, tin, lead, and bismuth. These compounds generally improve the anti-static qualities of polymeric substrates and, when the latter are in the form of fabrics, improved their resistance to soiling.

The coating material may be present on the surface of the swollen shaped polymer during irradiation, but its presence at that time is not essential. The radiation activitates the surface toward attachment of the coating, and, if the coating is applied within the period during which the surface remains active, attachment of the coating takes place. The time which may elapse between the irradition and the contacting step will vary with the radiation exposure, temperature and atmosphere of storage and the chemical nature of the irradiated swollen polymer. A storage time of not over five minutes between steps is usually preferred, and substantially immediate contact (less than one second) is frequently desirable. It has been observed, however, that the effects of the irradiation can be sustained for longer periods of time, i.e., weeks and even months, if the irradiated shaped swollen polymer is kept in an inert atmosphere such as under nitrogen, argon, helium, or the like and/or is stored at low temperature such as at $-80°$ C. In general, the lower the temperature at which the irradiated shaped swollen polymer is stored, the longer time the surface remains active toward adhering the coating material. It is thus possible to irradiate the shaped swollen polymer at a site of available radiation and then by maintaining suitable storage conditions to ship the irradiated polymer to another site for carrying out the contacting step. However, the yield of coating attached for a given radiation exposure is greater when the coating is present during radiation and, for economic reasons, this represents the preferred practice of this invention.

The temperature at which the irradiation step is carried out may be varied widely. Thus with normally gaseous swelling agents such as methane and ethane, it may be desirable to irradiate the swollen shaped polymer at temperatures as low as $-200°$ C. On the other hand, it has been observed that with swollen compositions which soften sufficiently high, irradiation temperatures in the range of 100–160° C. are preferred since maximum effect of the radiation is obtained in this temperature range. In any event the temperature of the swollen polymeric composition during irradiation should not exceed the softening temperature of the composition.

The solvent employed in the extracting step of this invention must be a solvent for the swelling agent and a non-solvent for the polymer of the substrate at the temperature at which the extraction is conducted. For water-soluble swelling agents such as the lower alkanols, glycerine, ethylene glycol, polyethylene glycols, dimethylformamide, aqueous hydrotropic salt solutions and the like, water is preferred as the extracting agent.

For organic swelling agents such as dibutyl sebacate, dioctylphthalate, and the like, organic solvents such as ethers, hydrocarbons, chloroform, and the like may be used. In general, the extraction of the swelling agent is more rapid and complete at elevated temperatures, and, for economic reasons, it is therefore preferred to carry out the extraction step at or near the boiling temperature of the solvent.

When it is desired to determine the amount of coating attached, any excess of unreacted coating material may be removed by solvent extraction. In the examples below this is carried out by employing in the extraction step a solvent for the swelling agent which is also a solvent for unreacted coating material. This procedure is convenient but it is not essential to the process.

In the following examples parts are by weight, except where otherwise specified.

EXAMPLE 1

(A) A 0.003" film of polyvinyl chloride/dioctyl phthalate 100/60 was wet with a solution of one part of glycerol-1-$C^{14}$ (0.1 millicurie/gram) in 55 parts of ethanol. The film was placed in an aluminum box with a cover of 0.00025" polyethylene terephthalate film. Nitrogen was passed through the box for 90 minutes to allow the ethanol to evaporate. The box was then placed in a 40° C. water bath and, with continued passage of nitrogen, subjected to electron irradiation by passage 40 times at a rate of 2 cm./sec. under the electron beam of a Van De Graaff accelerator operating at 2 m.e.v. and 250 microamps. The scan width of the beam was 20 cm. at a window-to-sample distance of 10 cm. Under these conditions, the total radiation exposure was 500 watt-sec./$cm.^2$.

The irradiated film was extracted with running water at 40° C. until the retained activity, as indicated by an end window Geiger counter (Tracerlab Superscaler) was constant at a level of 28–47 counts/min./2.5 $cm.^2$ above background. On the basis of a separate calibration by combustion analysis, this level of activity was equivalent to $4-7 \times 10^{-4}$ g. of bound glycerol/g. of plasticized polyvinyl chloride. Assuming that each molecule of glycerol occupies 25 $A.^2$ of surface area, this level of activity corresponds to 14–24 monolayers of bound glycerol.

The film was then extracted to constant activity in a Soxhlet with constant boiling HCl. The activity level was then 26 counts/min./2.5 $cm.^2$. This shows that the bulk of the grafted activity was attached by hydrolytically stable C—C bonds, rather than labile ester or peroxide linkages.

(B) The above extractions with water and hydrochloric acid were designed to remove any unbound glycerol, but to leave the bulk of the plasticizer in the polymer. To demonstrate that the glycerol was grafted almost exclusively to the polymer, a film which had been similarly coated with glycerol and irradiated was extracted to constant activity in a Soxhlet with ether. The weight loss was 42%, which indicated that this extraction had removed essentially all of the dioctyl phthalate plasticizer. The retained activity was 27 counts/min./2.5 $cm.^2$. Thus, a treatment which had removed essentially all of the plasticizer failed to reduce the amount of bound glycerol, demonstrating that the glycerol was bound essentially exclusively to the polymer. The bound glycerol reduces the tendency of the film to accumulate a static charge on friction and improves its wettability by water.

(C) In contrast to the above results, a film of polyvinyl chloride/dioctyl phthalate which was simply coated with the tagged glycerol, dried under nitrogen, heated 40 minutes at 40° C. without irradiation, and finally extracted with running 40° C. water did not retain any significant amount of activity. Furthermore, a film of unplasticized polyvinyl chloride which was carried through the coating, drying, irradiation and water extraction treatments as described above retained an activity of only 2–5 counts/min./2.5 $cm.^2$. This demonstrates the important effect of the swelling agent in promoting increased radiation-induced grafting onto the polymeric substrate.

EXAMPLES 2–11

In the following examples the procedure of Example 1 was repeated, using thin films of substrates as indicated in the following table. The coated substrates (both controls and those containing swelling agents) were then irradiated as in Example 1. Subsequent extractions with water or ether were carried out as in Example 1. Results are shown in Table I.

polymeric substrate by irradiation and resulted in a product which was more pliable after solvent extraction.

Table I

| Ex. | Polymer | Swelling agent (percent of polymeric substrate) | Coating material | Extracting agent | Proportion of swelling agent removed in extraction, percent | Activity of affixed coating in counts/min. | Approximate number of monolayers of coating material affixed |
|---|---|---|---|---|---|---|---|
| 2 | Polyethylene terephthalate | None (control) | Glycerol-1-C$^{14}$ | Water | | 1 | 1 |
|   | do | 6-8% benzyl alcohol | do | do | 68 | 32 | 16 |
| 3 | do | None (control) | Palmitic acid-1-C$^{14}$ | Ether | | 2-3 | 1-4 |
|   | do | 6-8% benzyl alcohol | do | do | 78 | 10 | 4-14 |
| 4 | Polyacrylonitrile | None (control) | Glycerol-1-C$^{14}$ | Water | | 1 | 1 |
|   | do | 3-8% dimethylformamide | do | do | ca. 100 | 107 | 53 |
| 5 | do | None (control) | Palmitic acid-1-C$^{14}$ | Ether | | 0-4 | 0-6 |
|   | do | 3-8% dimethylformamide | do | do | 54 | 55 | 23-77 |
| 6 | Polyvinyl alcohol | None (control) | Glycerol-1-C$^{14}$ | Water | | 2 | 1 |
|   | do | 25-28% glycerol | do | do | ca. 100 | 51 | 25 |
| 7 | do | None (control) | Palmitic acid-1-C$^{14}$ | do | | 2 | 1-3 |
|   | do | 25-28% glycerol | do | do | ca. 100 | 8 | 4-12 |
| 8 | Polyvinyl chloride | None (control) | do | Ether | | 4-6 | 2-8 |
|   | do | 37.5% dioctyl phthalate | do | do | ca. 100 | 101-108 | 43-150 |
| 9 | do | 37.5% dibutyl sebacate | do | do | ca. 100 | 99-150 | 42-210 |
| 10 | Polyvinyl fluoride | None (control) | Glycerol-1-C$^{14}$ | Water | | 11-15 | 5-7 |
|   | do | 30% butyrolactone | do | do | >50 | 54-71 | 27-35 |
|   | do | 43% butyrolactone | do | do | >50 | 49-52 | 24-26 |
| 11 | do | None (control) | Stearic acid-2-C$^{14}$ | Ether | | 4 | |
|   | do | 5% butyrolactone | do | do | ca. 100 | 8-9 | |
|   | do | 30% butyrolactone | do | do | ca. 100 | 31-35 | |
|   | do | 43% butyrolactone | do | do | ca. 100 | 26-29 | |

The tagged (radioactive) atoms in the bound films render the same anti-static. Palmitic and stearic acid films render the substrate more hydrophobic or water-repellant. This action is particularly important in the case of the polyvinyl alcohol, normally very water-sensitive.

EXAMPLE 12

A 0.002" thick film of polyvinyl chloride/dibutyl sebacate 100/60 was immersed in monomeric styrene and irradiated at 50° C. in an atmosphere of nitrogen for 40 passes with 2-m.e.v. electrons, a total exposure of 500 watt-sec./cm.$^2$. The film was then extracted to constant weight with benzene in a Soxhlet. The extraction removed substantially all of the dibutyl sebacate, but the product exhibited a retained weight gain of 3% over the plasticized starting material. This gain is equivalent to 64% of grafted polystyrene, based on the polyvinyl chloride content of the plasticized film. The film had a modulus in tension of 162,000 lbs./in.$^2$. A similarly plasticized film, similarly irradiated in the absence of styrene, lost 34% in weight upon similar extraction which shows that the plasticizer was almost wholly removed by the extraction, and hence that the polystyrene was affixed almost wholly to the polyvinyl chloride.

Similar irradiation of an unplasticized polyvinyl chloride film in the presence of styrene, followed by similar extraction, resulted in a retained weight gain of only 15% based on the polyvinyl chloride (compared with 64% in plasticized material). The final modulus in tension of the film was 200,000 lbs./in.$^2$. Thus, the presence of the dibutyl sebacate plasticizer caused a four-fold increase in the amount of polystyrene which became affixed to the

EXAMPLE 13

A 0.002" thick film of polyvinyl chloride/dibutyl sebacate 100/60 was held at room temperature for 6 hours at 0.08 mm. vacuum and then irradiated in a vacuum at −80° C. for 40 passes with 2-m.e.v. electrons, a total exposure of 500 watt-sec./cm.$^2$. During irradiation, the pressure rose to 1.08 mm. The irradiated film was re-evacuated to a pressure of 0.1 mm. and then, after storing for 20 minutes at −80° C., was allowed to warm up and stand for 3 days at room temperature in an atmosphere of monomeric styrene vapor. Unreacted styrene was removed by evacuating for 6 hours at 0.1 mm. The film was then extracted to constant weight with benzene in a Soxhlet, a process shown in the previous example to remove essentially all of the dibutyl sebacate plasticizer. The weight of the film then showed that 32% of polystyrene, based on the polyvinyl chloride, had become unextractably affixed to the polyvinyl chloride. The extracted film had a modulus in tension of 103,000 lbs./in.$^2$.

In contrast, a similar irradiation of an unplasticized film of polyvinyl chloride, followed by similar exposure to styrene vapor, resulted in an initial weight gain of only 2.95% based on the polyvinyl chloride, and essentially none of this remained after extraction with benzene. This film was stiffer than the irradiated film above and had a modulus in tension of 151,000 lbs./in.$^2$.

EXAMPLE 14

Five samples of nylon taffeta fabric, coded A to E respectively, are soaked in a solution of 16 parts of "Carbowax" 20,000 (trademark for a polyethylene glycol having a molecular weight of 20,000) and 84 parts of water. Samples C, D and E are then dried in air. Samples A–D Table II
EFFECT OF WATER ON RADIATION-GRAFTING "CARBOWAX"

| Sample | Agent | No. passes[1] | Weight increase | | Electrical resistivity (log R[3]) | |
|---|---|---|---|---|---|---|
| | | | 5 wash.[2] | 15 wash.[2] | 5 wash.[2] | 15 wash.[2] |
| A | 16% aqueous solution of "Carbowax" 20,000 | 20 | 0.531 | 0.446 | 9.0 | 9.5 |
| B | do | 40 | 0.385 | 0.314 | 9.1 | 9.3 |
| C | Same as above after evaporation | 20 | 0.029 | 0.018 | 10.9 | 13.3 |
| D | do | 40 | 0.062 | 0.040 | 10.8 | 13.1 |
| E | do | 0 | | 0.006 | 13.1 | 13.3 |

[1] One pass=12.5 watt-sec./cm.$^2$ exposure.
[2] Thirty minute washings in 0.125% by weight aqueous solution of a commercial detergent.
[3] 50% RH; 79−2° F.

are enclosed in polyethylene film bags and are then irradiated, using a 2 m.e.v. Van de Graaff electron accelerator operated at a beam-out current of 250 microamperes. The samples are traversed back and forth under the electron beam, and receive an exposure of 12.5 watt-seconds/cm.$^2$, per pass. The number of passes given each sample is shown in the table. Sample E, which served as a control, received no irradiation treatment. Following the irradiation, the samples are subjected to repeated washing treatments in synthetic detergent solution. The anti-static properties of each sample are evaluated by determining the direct current resistivity at 50% RH and 79° F.; the results are shown in Table II.

It is apparent that there was a much greater efficiency of grafting when such grafting was carried out in the presence of water.

It should be noted that the process of the present invention may result in certain effects accompanying the attachment of a surface coating. For example, some of the coating material may penetrate at least partly into the swollen substrate and become affixed therein by the action of the radiation. Also some of the swelling agent may become affixed within the substrate due to the action of the radiation. These effects usually involve only minor proportions of the reactants and in any event do not affect the major objective of attachment of a surface coating. The coating material may, however, be termed broadly a "modifying" agent or material.

The shape of the swollen polymer employed in the present invention is not limited. It may be a film as illustrated in the foregoing examples. Also, it may be a molded object, fiber, knitted or woven fabric, tube, pipe, beading, tape, extruded molding, wire covering, powder or the like. Of particular advantage are the film, fiber, fabric, and various extruded forms since they are readily adapted to continuous operation according to the process of this invention. Swollen polymers in these forms may be unrolled or extruded into the path of ionizing radiation either before or after contact with the coating material. By suitable arrangement of equipment the subsequent extraction step may be carried out in the same continuous operation.

The process of the present invention is valuable in creating surface effects upon shaped articles produced from organic polymers. It may be employed upon textiles to affect softness, resilience, tendency to shrink, static propensity, dyeability, pilling, hydrophilicity, wickability, and the like. It is useful in varying such properties as abrasion and wear resistance, moisture regain, dry-cleaning properties, light durability, soilability, ease of soil removal, laundering properties, dyeability (depth, rate, permanence and uniformity), printability, washfastness of dyes or finishing treatments (resins, ultraviolet absorbers, etc.), handle and drape properties (stiffening or softening), heat-yellowing, snag resistance, ease in textile processability, solubility (insolubilization or increase in solubility), bleachability, surface reactivity, delustering action, drying properties, thermal and electrical conductivity, transparency, light transmittance, air and water permeability, fabric comfort, felting, ion exchange properties, adhesion, over-all appearance and combinations of these as well as others.

In addition to the above modifications which it may be desirable to effect in fibrous articles, there are others which are particularly useful in other substrates, for example, in films and rigid and semi-rigid molded and extruded forms. By way of illustration, polymeric films may be modified to improve adhesion to various coating or laminating agents which it may be desirable to adhere thereto, to change "slip" or the ease with which one film slides over another, to produce non-reflective or decorative coatings on film or sheet, to improve the ease of printing colors on such sheet and the like.

Since many modifications in the invention will be obvious to those skilled in the art, we propose to be bound solely by the appended claims.

The embodiments of the invention in which an exclusive property or privilege is claimed are defined as follows:

1. In a process of coating, by means of ionizing radiation, a swollen, normally-solid organic polymer substrate with a chemically-distinct coating material which is not a swelling agent for said polymer substrate, the improvement which comprises (1) swelling the polymer substrate prior to irradiation by incorporating therein about 3–50% by weight, based on the weight of said substrate, of a nonpolymerizable normally-liquid swelling agent, said swelling agent being (a) chemically distinguishable from the substrate polymer, the monomeric species of the polymer and the material of the coating, and (b) compatible with and capable of causing the substrate polymer to swell at least 10% by volume, and (2) removing at least about 50% of the swelling agent from the polymer substrate after the coating is affixed thereto.

2. The invention of claim 1 in which the ionizing radiation is particle radiation.

3. The invention of claim 2 in which the ionizing radiation is electrons.

4. The invention of claim 1 in which the ionizing radiation is electromagnetic radiation.

5. The invention of claim 1 in which the coating material is an organic compound.

6. The invention of claim 1 in which the coating material is an organo-inorganic compound.

7. The invention of claim 1 in which the coating material is an inorganic oxide.

8. The invention of claim 1 in which the coating material is an inorganic salt.

9. The process of coating a normally-solid polymer substrate with a coating material which is not a swelling agent for said polymer substrate which comprises swelling said polymer by incorporating therein about 3–50% by weight of a nonpolymerizable normally-liquid swelling agent, said swelling agent being (a) chemically distinguishable from the substrate polymer, the monomeric species of the polymer and the material of the surface coating and (b) compatible with and capable of causing the substrate polymer to swell at least 10% by volume, subjecting the swollen polymer to 0.001–10,000 watt-sec./cm.$^2$ of substrate surface of ionizing radiation having an energy in the range of 50 to 10 million electron volts, contacting the substrate polymer with the material of the coating, the latter being chemically distinguishable from the substrate polymer as well as from the swelling agent, and finally removing at least 50% of the incorporated swelling agent.

10. The process of claim 9 in which the swollen polymer is subjected to ionizing radiation and subsequently contacted with the material of the coating.

11. The process of claim 9 in which the swollen polymer is contacted with the material of the coating and subsequently subjected to ionizing radiation.

12. The process which comprises plasticizing a polyvinyl chloride substrate by incorporating therein about 3–50% of the weight of said substrate with a normally-liquid swelling agent therefor, said swelling agent being capable of swelling the substrate at least 10% by volume thereof, contacting the plasticized substrate with a coating material which is chemically distinct from the swelling agent, the substrate and the monomers thereof and which is not a swelling agent for the substrate, irradiating the plasticized substrate and the coating material with 0.001–10,000 watt-sec./cm.$^2$ of ionizing radiation having an energy in the range of 50 to 10 million electron volts to bond the coating material to the substrate, and finally removing at least 50% of the swelling agent from the product.

13. The process of claim 12 in which the swelling agent is dioctyl phthalate and the coating material is glycerol.

14. The process which comprises plasticizing a polyethylene terephthalate substrate by incorporating therein about 3–50% of the weight of said substrate with a normally-liquid swelling agent therefor, said swelling agent being capable of swelling the substrate at least 10% by volume thereof, contacting the plasticized substrate with a coating material which is chemically distinct from the swelling agent, the substrate and the monomers thereof and which is not a swelling agent for the substrate, irradiating the plasticized substrate and the coating material with 0.001–10,000 watt-sec./cm.$^2$ of ionizing radiation having an energy in the range of 50 to 10 million electron volts to bond the coating material to the substrate, and finally removing at least 50% of the swelling agent from the product.

15. The process of claim 14 in which the swelling agent is benzyl alcohol and the coating material is glycerol.

16. The process of claim 14 in which the swelling agent is benzyl alcohol and the coating material is palmitic acid.

17. The process which comprises plasticizing a polyacrylonitrile substrate by incorporating therein about 3–50% of the weight of said substrate with a normally liquid swelling agent therefor, said swelling agent being capable of swelling the substrate at least 10% by volume thereof, contacting the plasticized substrate with a coating material which is chemically distinct from the swelling agent, the substrate and the monomers thereof and which is not a swelling agent for the substrate, irradiating the plasticized substrate and the coating material with 0.001–10,000 watt-sec./cm.$^2$ of ionizing radiation having an energy in the range of 50 to 10 million electron volts to bond the coating material to the substrate, and finally removing at least 50% of the swelling agent from the product.

18. The process of claim 17 in which the swelling agent is dimethylformamide and the coating material is glycerol.

19. The process which comprises plasticizing a polyvinyl alcohol substrate by incorporating therein about 3–50% of the weight of said substrate with a normally-liquid swelling agent therefor, said swelling agent being capable of swelling the substrate at least 10% by volume thereof, contacting the plasticized substrate with a coating material which is chemically distinct from the swelling agent, the substrate and the monomers thereof and which is not a swelling agent for the substrate, irradiating the plasticized substrate and the coating material with 0.001–10,000 watt-sec./cm.$^2$ of ionizing radiation having an energy in the range of 50 to 10 million electron volts to bond the coating material to the substrate, and finally removing at least 50% of the swelling agent from the product.

20. The process of claim 19 in which the swelling agent is glycerol and the coating material is palmitic acid.

21. The process which comprises plasticizing a nylon substrate by incorporating therein about 3–50% of the weight of said substrate with a normally-liquid swelling agent therefor, said swelling agent being capable of swelling the substrate at least 10% by volume thereof, contacting the plasticized substrate with a coating material which is chemically distinct from the swelling agent, the substrate and the monomers thereof and which is not a swelling agent for the substrate, irradiating the plasticized substrate and the coating material with 0.001–10,000 watt-sec./cm.$^2$ of ionizing radiation having an energy in the range of 50 to 10 million electron volts to bond the coating material to the substrate, and finally removing at least 50% of the swelling agent from the product.

22. The process of claim 21 in which the swelling agent is water and the coating material is polyethylene glycol.

23. The process which comprises swelling a polyethylene terephthalate substrate with benzyl alcohol, contacting the swelled substrate with a vinylidene monomer, irradiating the swelled substrate and the coating material with high-energy ionizing radiation to chemically bond the coating material to the substrate and washing the treated substrate with a solvent for the swelling agent.

References Cited in the file of this patent

UNITED STATES PATENTS 2,668,133    Brophy _____ Feb. 2, 1954

OTHER REFERENCES

Ballantine: "J. Pol. Science," vol. 19, No. 91, pp. 219–224.